Patented June 9, 1953

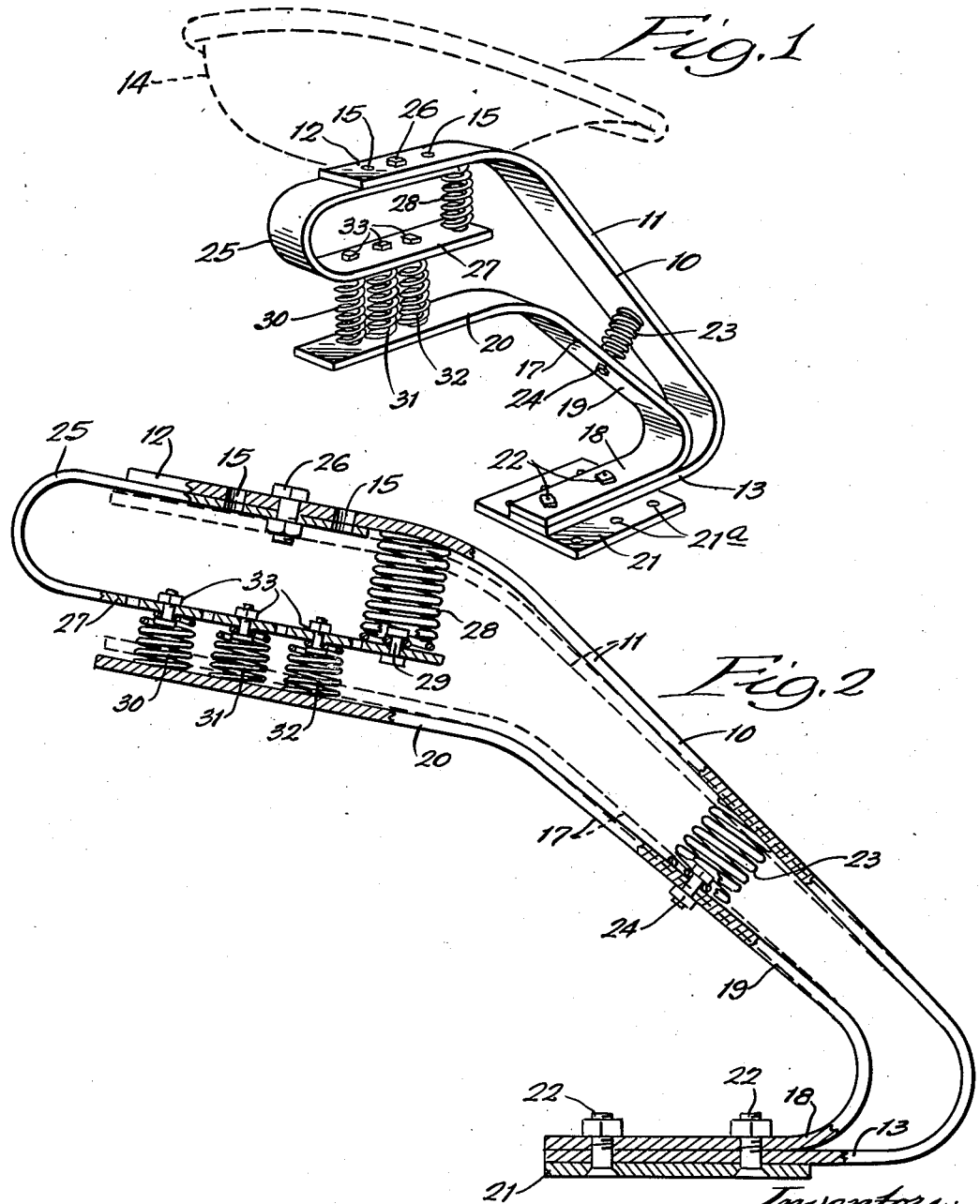

2,641,307

UNITED STATES PATENT OFFICE 2,641,307

SEAT SUPPORT

James F. McKinney and Arthur E. Miller, Aurora, Ill., assignors to Farm Appliance Corporation, Aurora, Ill., a corporation of Illinois Application March 5, 1948, Serial No. 13,318

5 Claims. (Cl. 155—51)

This invention relates to a seat support and particularly to the support for the seat of a vehicle, such as a tractor or other rugged vehicular ditching, road-working, or cultivating machine normally driven over uneven terrain.

This invention is an improvement over a seat support for vehicles fully described in a pending application Serial No. 674,239, filed June 4, 1946, which has matured into Patent No. 2,597,252. In the pending application, the vehicle seat support is comprised of a pair of curvilinear spring metal straps joined together at one end and connected to the vehicle. One of the straps has a free seat mounting end portion which, responsive to road shock, is flexed up and down in spring action while absorbing the road shock.

The importance of a comfortable and safe seat for the operator of rugged earth working or road working machines and tractors of the type described is becoming more apparent day by day. Numerous investigations have established the fact that the speed at which one of these machines can be operated is dependent on the ability of the seat to support the full weight of the operator in a safe and comfortable manner, and the efficiency and productivity of an operator is more or less proportional to the fatigue which he experiences. Both of these controlling factors relate to the riding characteristics of the seat, and considerable effort is being directed to construct a seat assembly which will offer a safe and comfortable ride while the machine is travelling over normal surfaces and terrain at various rates of speed.

In order to secure the desired riding characteristics, it is a desideratum greatly to reduce the extent of up and down flexing or swinging movement of the seat once it is actuated for shock or impact. It is also important to lessen the number of such up and down swings of the seat. Another factor which is important in determining riding comfort resides in the angularity of the seat under the full weight of the operator. Empirical tests have shown that the operator is most comfortable when the rearward portion of the seat is above the forward portion. The exact relation is difficult to establish but a difference of about three-eighths of an inch between the back and the front appears best. The problem which arises in this connection is to provide a seat mounting which automatically adjusts the seat to the desired angular relationship for best riding comfort without the necessity of readjusting the seat every time drivers of different weight assume the operating position. Such changes in drivers are often made during a day's operation of the machine.

It is an object of this invention to produce a seat support which provides a smooth, safe, and comfortable ride for operators of vehicles of the type described.

Another object is to produce a shock absorbing seat support which quickly and smoothly returns the seat to normal driving position.

A further object is to produce a seat support which provides a comfortable shockproof ride to the driver of the vehicle while travelling at relatively high speeds and over rough terrain by generating counteracting and counterbalancing forces which reduce the extent and number of up and down seat movements ordinarily resulting from the travel of the vehicle.

A further object is to produce a seat mounting which is automatically adjustable to position the seat at a forward incline for best riding comfort notwithstanding the weight of the operator seated thereon.

A still further object is to produce a shock absorbing seat support for tractors and the like which is constructed of relatively few simple parts which are readily assembled as a separate unit for mounting on the tractor in connection with or apart from the normal assembly line operations.

These and other objects and advantages of this invention will hereinafter appear, and for purposes of illustration, but not of limitation, an embodiment of the invention is shown in the accompanying drawing in which—

Figure 1 is a perspective elevational view of a seat support embodying the features of this invention; and Figure 2 is an elevational detail view partially in section of the support shown in Fig. 1.

The cardinal features of this invention are embodied in a seat support or mounting having a pair of curvilinear spring metal straps joined together at one end for connection to the vehicle frame. The free end portions of the straps are in vertically spaced-apart relation with the upper having means for mounting the seat. The two straps are interconnected at their spaced-apart portions by spring members which expand the ends apart from their normally relaxed position. Because of the difference in their length, curvature, and contour, the two straps are unable to react identically to shock causing flexing movements so that their rhythm is substantially immediately broken and the seat is quickly and smoothly brought to rest after a minimum of up and down movements.

Another important feature resides in the arrangement of parts whereby a series of spring members controlling the spaced relation between the free ends of the spring metal straps operate selectively and automatically to adjust the angular relation of the seat mounting portion to the most comfortable position corresponding to the weight of the operator.

Referring now to the drawing, 10 indicates an outer spring metal strap having an inwardly inclined intermediate portion 11 and integral upper and lower end portions 12 and 13 respectively extending substantially horizontally in the same direction and in vertically spaced relation. The end portion 12 of the outer strap is adapted to carry the seat 14 and, for this purpose, openings 15 are provided for receiving a bolt or other seat fastening means secured to the underside of the seat. Another inner spring metal strap 17 is formed with horizontally disposed spaced-apart end portions 18 and 20 which are integrally connected at their forward ends by an inclined intermediate portion 19. The angular relation between portions 18 and 19 of the inner strap is less than the angular relation between portions 11 and 13 of the outer strap. Correspondingly, the obtuse angle between portions 19 and 20 of the inner strap is greater than the obtuse angle between portions 11 and 12 of the outer strap. In their assembled relation, the portion 18 is fixed atop portion 13, and, because of the differences in angular relations, the intermediate portions 19 and 11 diverge from each other and the end portions 20 and 12 are vertically spaced apart and at a slight angle with each other. Thus the two straps differ in contour, radius of curvature, and it is apparent that the inner strap can be of shorter length than the outer. As a result, when these straps are resiliently interconnected between their spaced-apart portions, their rhythms in up and down movement differ, with the result that they quickly but smoothly return to their normal riding position.

The assembled spring metal straps 10 and 11, as shown, are fixed to a mounting plate 21 by bolt and nut means 22, and openings 21a are provided in the ends of the plate for receiving fastening means for securing the same to the tractor.

Spring members are used resiliently to connect these spaced-apart portions of the spring metal straps, and by arranging these spring members in a manner further to tension the straps to assume a stressed position or expanded position in which they are flexed away from each other in normal mounted position, the extent of bouncing movement is considerably lessened and the number of swings before the strap members come to rest is greatly reduced. The strap members in Fig. 2 are shown in their normal expanded position while the broken lines indicate the normal position these same straps would assume in the absence of the resilient members forcing them apart.

One of these resilient means, such as a coil spring 23, is disposed between the spaced, inclined intermediate portions of the straps, one end of the spring being connected to the inner strap 17 by bolt means 24, while the other end merely bears against the under side of the outer strap portion 11. Although mere inter-connection of the spaced-apart end portions 12 and 20 of the respective strap members by similar compression coil springs may suffice to effect the desired results, it is more effective if a multiplicity of aligned spring members, hereinafter referred to as cushioning springs, are employed in cooperation with a U-shaped spring metal member 25. One arm of the U-shaped spring metal member is secured by bolt means 26 to the underside of the free end portion 12 of the outer strap 10, while the other free arm 27 of the U-shaped member extends inwardly between the spaced-apart free end portions of the inner and outer spring metal straps 10 and 17 respectively.

The free end portion of the arm 27 is urged in the direction away from the end portion 12 of the seat carrying strap by a coil spring 28 of the compression type disposed therebetween and connected by bolt means 29 to the arm 27. Other aligned compression or cushioning coil springs 30, 31, and 32 are disposed between the underside of the free arm 27 of the U-shaped member 25 to which they are secured by bolt and nut means 33 and the upper wall of the section 20.

In operation, the spring 23 operates as a recoil spring effective immediately upon relative movement between straps to oppose the deflection of the strap 10 when it is flexed downwardly in the direction of the other strap 17. The principal recoil and cushioning effect is imparted by the spring members 28, 30, 31, and 32 in cooperation with the spring member 25. These resilient members operate further to tension the end sections 20 and 21 apart rapidly to return the straps and, correspondingly, the drive seat to normal operative position and to reduce the extent of vertical movement of the seat carrying end portion 12.

As previously pointed out, another feature of this invention resides in the means automatically adjusting the seat to the most comfortable position in accordance with the weight of the operator. This most comfortable position has been determined to be a forwardly inclined position in which the rear of the seat is about three-eighths inch higher than the front. Heretofore, each operator has had to manually adjust the seat for his own use, and when it is understood that several persons of different weights may operate the machine in a single day, it will be apparent that considerable time and effort are lost and the resulting wear and tear on the adjusting mechanism soon renders the same ineffective.

In our improved seat support, the initial position of the seat supporting section 12 is such that the desired incline is provided without reliance on the cushioning springs 30, 31, and 32 until the weight of the operator exceeds a predetermined value, say seventy-five pounds. When operators of greater weight are used, these cushioning springs become effective in proper order in response to the angular relationship of the parts upon flexure under increasing load to maintain the angular relation of the seat. For example, spring 32 becomes effective to assist in counteracting weights of 75 to 125 pounds, springs 32 and 31 become effective at weights up to 175 pounds, and all three become effective to counteract greater weights.

It will be apparent from the description that we have produced a seat mounting which can be comfortably used by all operators without adjustment and which, when in use, offers a smooth floating ride heretofore unobtainable in rugged equipment of the type described. The essential elements are not complex or expensive but can be readily formed by simple methods of inexpensive parts and readily assembled with power equipment or separate and apart from the vehicle assembly line to be later installed in place. The assembled unit may also be substituted on existing equipment or on equipment not provided with the improved mounting thereby to improve vehicles already in use.

It will be understood that we have produced a new and improved vehicle seat mounting or support comprising a pair of connected spring metal straps which differ in curvature and contour so that their free end portions are spaced apart and further tensioned apart by recoil and cushioning springs, part of which operate additionally as leveling and stabilizing members automatically to position the seat at a desired angle and quickly and smoothly to return the seat to its normal position. From a comparative standpoint, my improved mounting reduces the number of up and down swinging movements of a seat from 17 swings to about 2 to 4 swings, and the extent of swinging movement may be reduced from 14 inches to between 1½ to 4 or 5 inches.

It will be further understood that other resilient materials may be used to form the spring straps 10, 11, and 25, and that other resilient members, such as leaf springs, may be used in place of the various coil springs described. In addition, numerous changes may be made in the details of construction, arrangement, and operation of the various parts without departing from the spirit of the invention, especially as defined in the following claims.

We claim as our invention:

1. A support for a vehicle seat comprising a pair of spring strips positioned one upon the other and connected together at one end for mounting on the vehicle and having inclined divergent rearwardly extending portions intermediate the ends and horizontally disposed free end portions in spaced apart relation, a seat support in the horizontally disposed end portion of the upper strip, resilient means constantly urging the divergent portions of the straps toward expanded positions, said resilient means including coil springs interposed between the other horizontally free end portions of the spaced straps.

2. A support for a tractor seat comprising a first and second spring strip positioned one on the other and secured together at one end for mounting on the tractor and having inclined divergent rearwardly extending portions intermediate the ends and substantially horizontally disposed, spaced, rearwardly extending free end portions, a third curvilinear strip rigid with the first strap and having a free end portion disposed between the free end portions of the first two straps, and resilient connections between each of the straps constantly to urge their free end portions in the direction away from each other.

3. A support for a tractor seat comprising a spring metal strap having an inclined intermediate portion and a horizontally disposed end portion for mounting the tractor seat, another spring metal strap having a lower horizontal portion at one end connected with the horizontal portion of the first strap for mounting onto the tractor and having an intermediate portion inclined at an angle from the horizontal portion differing from that of the angle between the intermediate portion and the horizontal portion of the first strap whereby the intermediate inclined portions diverge from each other in spaced relation so that each moves through different paths when flexed in response to applied forces, a coil spring interconnecting the divergent portions between the spring metal straps, a third spring metal strap connected at one end portion to the underside of the seat supporting end portion of the first strap and having a free end portion disposed between the spaced apart end portions of the first two straps, and resilient means operatively connecting the spaced apart portions of the various straps to expand the first two straps from their normal position and relate the flexing movements whereby they are quickly and smoothly returned to their normal expanded position.

4. A support for a tractor seat comprising a spring metal strap having an inclined intermediate portion and a horizontally disposed end portion for mounting the tractor seat, another spring metal strap having a lower horizontal portion at one end connected with the horizontal portion of the first strap for mounting onto the tractor and having an intermediate portion inclined at an angle from the horizontal portion differing from that of the angle between the intermediate portion and the horizontal portion of the first strap whereby the intermediate inclined portions diverge from each other in spaced relation so that each moves through different paths when flexed in response to applied forces, a third strap in the form of a U-shaped member connected to the seat supporting end portion of the first strap with the free end extending in the direction opposite the free end of the first two straps, and coil springs interposed between the free end portions of the first and third straps and between the second and third straps constantly to urge the end portions apart.

5. A support for a tractor seat comprising a spring metal strap having an inclined intermediate portion and a horizontally disposed end portion for mounting the tractor seat, another spring metal strap having a lower horizontal portion at one end connected with the horizontal portion of the first strap for mounting onto the tractor and having an intermediate portion inclined at an angle from the horizontal portion differing from that of the angle between the intermediate portion and the horizontal portion of the first strap whereby the intermediate inclined portions diverge from each other in spaced relation so that each moves through different paths when flexed in response to applied forces, a third U-shaped strap connected to the seat supporting portion of the first strap with a free end extending in the opposite direction of the free ends of the first two straps, a coil spring disposed between the end portion of the U-shaped strap and the inner end portion of the seat supporting end portion of the first strap, and a plurality of aligned coil springs disposed between the free end portion of the U-shaped member and the end portion of the second strap.

JAMES F. McKINNEY.
ARTHUR E. MILLER.

References Cited in the file of this patent

UNITED STATES PATENTS

| Number | Name | Date |
|---|---|---|
| 74,208 | Dutton | Feb. 11, 1868 |
| 476,238 | Bauer | June 7, 1892 |
| 633,177 | Worthington | Sept. 19, 1899 |
| 736,665 | Wilson | Aug. 18, 1903 |
| 1,193,977 | Bereth | Aug. 8, 1916 |
| 1,390,865 | Bangle | Sept. 13, 1921 |
| 1,433,720 | Hendrickson | Oct. 31, 1922 |
| 2,191,317 | Howard | Feb. 20, 1940 |

FOREIGN PATENTS

| Number | Country | Date |
|---|---|---|
| 604,340 | Great Britain | July 1, 1948 |